(12) United States Patent
Barger et al.

(10) Patent No.: US 12,188,615 B2
(45) Date of Patent: Jan. 7, 2025

(54) MACHINE LUBRICATION SYSTEM

(71) Applicant: Suburban Manufacturing, LLC, Monticello, MN (US)

(72) Inventors: Bradley Barger, Monticello, MN (US); Dustin Ericson, Monticello, MN (US); Cade Gamrath, Monticello, MN (US)

(73) Assignee: Suburban Manufacturing, LLC, Monticello, MN (US)

( * ) Notice: Subject to any disclaimer, the term of this patent is extended or adjusted under 35 U.S.C. 154(b) by 0 days.

(21) Appl. No.: 18/438,747

(22) Filed: Feb. 12, 2024

(65) Prior Publication Data

US 2024/0183490 A1 Jun. 6, 2024

Related U.S. Application Data

(63) Continuation of application No. 17/742,734, filed on May 12, 2022, now Pat. No. 11,898,700.

(60) Provisional application No. 63/317,193, filed on Mar. 7, 2022.

(51) Int. Cl.
| | |
|---|---|
| *F16N 7/38* | (2006.01) |
| *F16N 19/00* | (2006.01) |
| *F16N 29/00* | (2006.01) |
| *F16N 39/04* | (2006.01) |
| *F16N 99/00* | (2006.01) |

(52) U.S. Cl.
CPC .............. *F16N 7/38* (2013.01); *F16N 19/00* (2013.01); *F16N 29/00* (2013.01); *F16N 39/04* (2013.01); *F16N 99/00* (2013.01); *F16N 2250/18* (2013.01)

(58) Field of Classification Search
CPC .................................. F16N 7/38; F16N 19/00
See application file for complete search history.

(56) References Cited

U.S. PATENT DOCUMENTS

| | | | | | |
|---|---|---|---|---|---|
| 1,933,403 | A | * | 10/1933 | Wilson ..................... | F16N 39/04 392/480 |
| 1,991,341 | A | * | 2/1935 | Aycock .................... | F16N 13/20 184/6 |
| 2,074,503 | A | * | 3/1937 | Dodge .................... | F16N 19/00 141/330 |
| 2,322,808 | A | * | 6/1943 | Hothersall ............... | F16N 19/00 222/327 |
| 3,184,782 | A | * | 5/1965 | Armour ................ | B65D 47/263 222/548 |
| 3,845,884 | A | * | 11/1974 | Myers ................... | B65D 1/0223 222/173 |
| 4,211,439 | A | * | 7/1980 | Moldestad ............ | F16L 37/113 285/376 |
| 4,614,437 | A | * | 9/1986 | Buehler ............ | B01F 35/32021 215/390 |

(Continued)

*Primary Examiner* — Michael A Riegelman
(74) *Attorney, Agent, or Firm* — Dicke, Billig & Czaja, PLLC

(57) ABSTRACT

A machine lubrication system includes a bellows-type container filled with lubricant that connects to a support base of a pump of the lubrication system. The container includes a neck extending from a convex bottom surface of the container. The support base includes a concave mounting surface and a passageway in communication with an inlet of the pump. The neck sealingly attaches the container to the passageway with the bottom surface of the container on the mounting surface the support base.

4 Claims, 6 Drawing Sheets

(56) References Cited

U.S. PATENT DOCUMENTS

| | | | | |
|---|---|---|---|---|
| 4,665,960 A * | 5/1987 | Brzezicki | F16L 19/00 | |
| | | | 285/379 | |
| 4,898,293 A * | 2/1990 | Morel | B65D 81/3211 | |
| | | | 215/250 | |
| 4,969,491 A * | 11/1990 | Kiplinger | E03C 1/30 | |
| | | | 141/319 | |
| 5,072,762 A * | 12/1991 | Jimenez | B65D 51/222 | |
| | | | 141/330 | |
| 5,141,133 A * | 8/1992 | Ninomiya | B67B 7/26 | |
| | | | 222/541.2 | |
| 5,152,428 A * | 10/1992 | Di Gerolamo | G07F 13/065 | |
| | | | 222/325 | |
| 5,293,913 A * | 3/1994 | Preszler | B41J 2/17506 | |
| | | | 141/346 | |
| 5,920,333 A * | 7/1999 | Bates | B65D 81/3205 | |
| | | | 347/85 | |
| 5,947,318 A * | 9/1999 | Palm | B65D 51/222 | |
| | | | 222/541.2 | |
| 6,196,522 B1 * | 3/2001 | Yuen | B67D 7/0288 | |
| | | | 251/351 | |
| 6,354,816 B1 * | 3/2002 | Yang | F16N 11/08 | |
| | | | 184/37 | |
| 6,458,269 B1 * | 10/2002 | Bassett | B01D 35/153 | |
| | | | 210/418 | |
| 7,228,941 B2 * | 6/2007 | Weigand | F16N 11/08 | |
| | | | 184/7.4 | |
| 7,458,665 B2 * | 12/2008 | Batista | B41J 2/1755 | |
| | | | 347/85 | |
| 8,109,236 B2 * | 2/2012 | Brodowski | A61P 33/00 | |
| | | | 222/83.5 | |
| 8,123,063 B2 * | 2/2012 | Kanda | F16N 19/00 | |
| | | | 220/666 | |
| 8,206,034 B2 * | 6/2012 | Keen | B65D 51/226 | |
| | | | 222/91 | |
| 8,474,495 B2 * | 7/2013 | Singleton | F16L 55/115 | |
| | | | 141/330 | |
| 8,544,610 B2 * | 10/2013 | Paluncic | F16N 11/08 | |
| | | | 184/26 | |
| 8,999,045 B2 * | 4/2015 | Ericson | B01D 53/261 | |
| | | | 96/144 | |
| 9,243,618 B2 * | 1/2016 | Ozeki | F04B 7/04 | |
| 10,179,677 B2 * | 1/2019 | Stever | B65D 37/00 | |
| 10,429,005 B2 * | 10/2019 | Patel | F16N 99/00 | |
| 10,717,568 B2 * | 7/2020 | Defert | B65D 51/222 | |
| 11,898,700 B2 * | 2/2024 | Barger | F16N 7/38 | |
| 2010/0112815 A1 * | 5/2010 | O'Dougherty | B67D 7/34 | |
| | | | 438/758 | |
| 2014/0013956 A1 * | 1/2014 | Ericson | B01D 53/261 | |
| | | | 96/118 | |
| 2014/0083879 A1 * | 3/2014 | Ulstad | B65D 51/225 | |
| | | | 215/11.1 | |
| 2020/0049310 A1 * | 2/2020 | Lisby | F16N 39/00 | |
| 2021/0404601 A1 * | 12/2021 | Kuno | F16N 11/08 | |
| 2022/0112981 A1 * | 4/2022 | Eisenbacher | F16N 13/22 | |
| 2023/0279990 A1 * | 9/2023 | Barger | F16N 7/38 | |
| | | | 184/6.22 | |
| 2024/0183490 A1 * | 6/2024 | Barger | F16N 29/00 | |

* cited by examiner

MACHINE LUBRICATION SYSTEM

CROSS REFERENCE TO RELATED APPLICATIONS

This application is a Continuation of U.S. patent application Ser. No. 17/742,734 filed May 12, 2022, now allowed, which claims the benefit of U.S. Provisional Patent Application Ser. No. 63/317,193, filed Mar. 7, 2022, which are both incorporated herein by reference.

FIELD OF THE DISCLOSURE

Embodiments of a lubricant container for a machine lubrication system are disclosed.

BACKGROUND

In operation, some machines require a lubrication system to supply lubricant to moving parts of the machine. Resupplying such systems with lubricant while keeping the system free of air can be messy, particularly for machines that perform work in soil, such as drills, trenchers, etc. Embodiments of a container filled with lubricant and system for connecting the container to a lubrication system pump are disclosed.

SUMMARY

In one embodiment, a lubricant delivery system for lubricating a machine comprises a body, a support base and a container. The body has an inlet. The inlet communicates with a pump for pumping lubricant to components of the machine requiring lubrication. The support base is connected to the body. The support base has a first end surface, a second end surface spaced from the first end surface, and a side wall extending between the first end surface and the second end surface. A passageway extends between the first end surface and the second end surface. The first end surface is mounted to the body with the passageway in communication with the inlet of the body. The second end surface of the support base includes an annular groove spaced radially from the passageway and a bore that communicates between the annular groove and the side wall of the support base. The container has an interior filled with a lubricant. The interior is defined by a pleated side wall, a top wall connected to a first end of the pleated side wall, and a bottom wall connected to a second end of the pleated side wall. A tubular neck is connected to the bottom wall, the tubular neck having an open end in communication with the interior of the container. The tubular neck is reversibly mountable within the passageway of the support base with the bottom wall in contact with the second end surface of the support base. The bottom wall of the container includes an annular lip configured to fit in the annular groove.

Other aspects of the invention will become apparent by consideration of the detailed description and accompanying drawings.

DETAILED DESCRIPTION

Before any embodiments of the machine lubrication system are described in detail, it is to be understood that the details of construction and the arrangement of components set forth in the following description or illustrated in the following drawings are exemplary and are not intended and should not be construed to limit the scope of the claims. The machine lubrication system described herein is capable of other embodiments and of being practiced or of being carried out in various ways consistent with this specification. Various aspects or features of the machine lubrication system disclosed herein may be used alone or in combination with other disclosed aspects or features.

Figure 1:
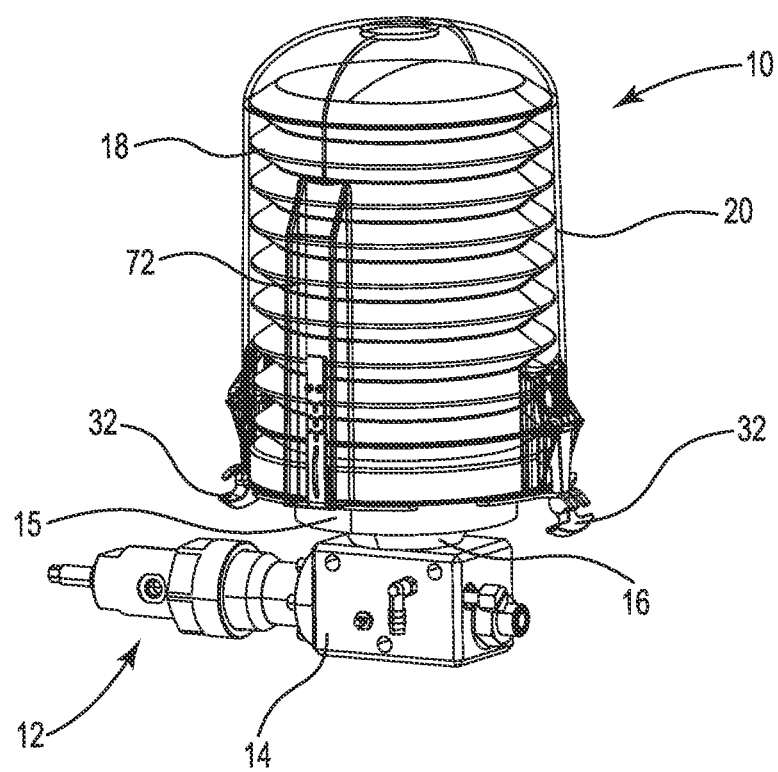
FIG. 1 is perspective view of one embodiment of a machine lubrication system.

FIG. 1 is a perspective view of one embodiment of a machine lubrication system 10 that is comprised generally of a lubrication pump 12 that communicates with a body 14 that provides an inlet for lubricant to the pump 12. The lubrication pump 12 is a conventional piston pump that may be mechanically or hydraulically actuated. Connected to the body 14 is a support base 16 for attaching and supporting a lubricant container 18. A cover 20 is provided over the container 18 and connects to the support base 16.

Figure 2:
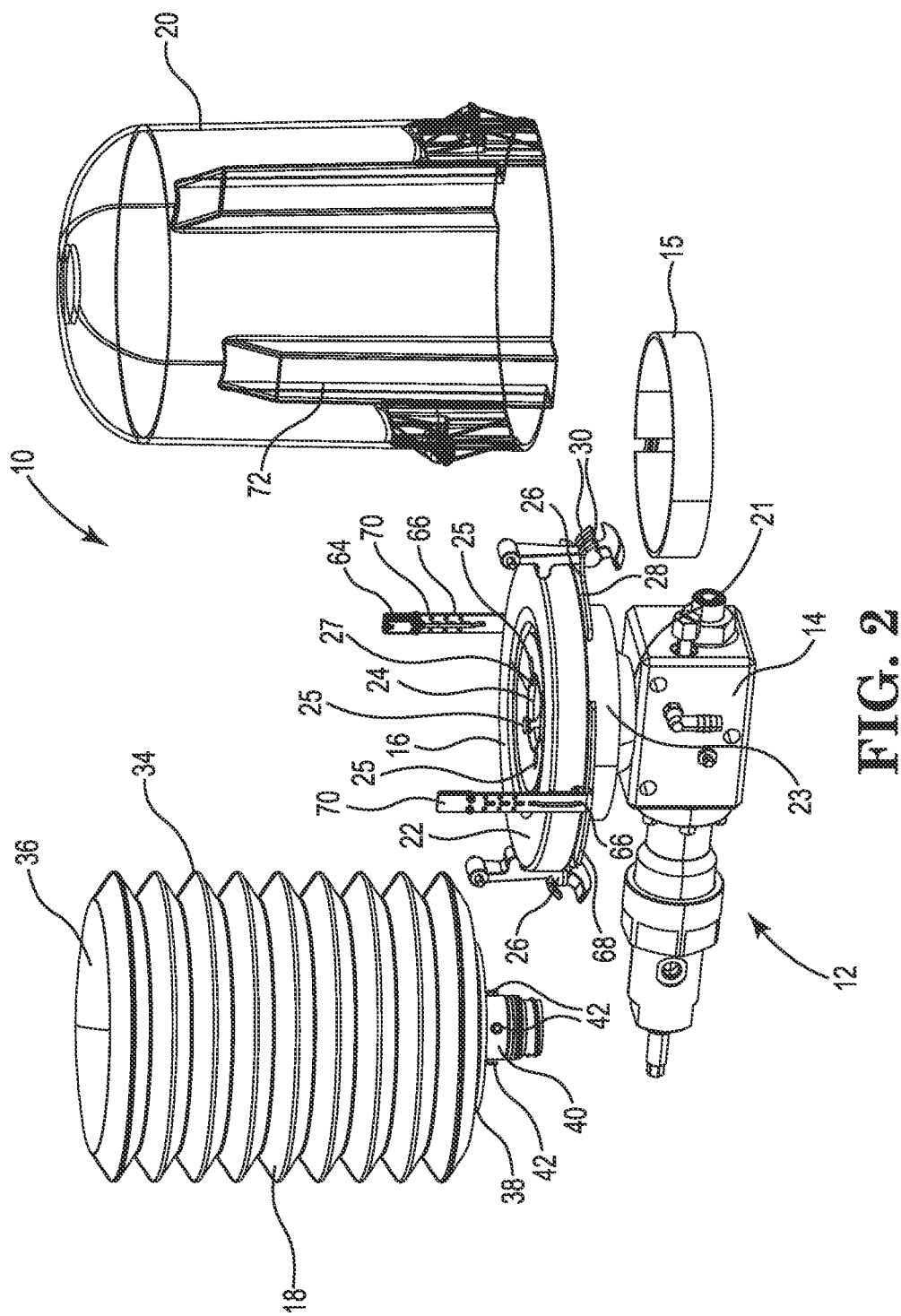
FIG. 2 is an exploded view of the machine lubrication system 10 of FIG. 1.
Figure 3:
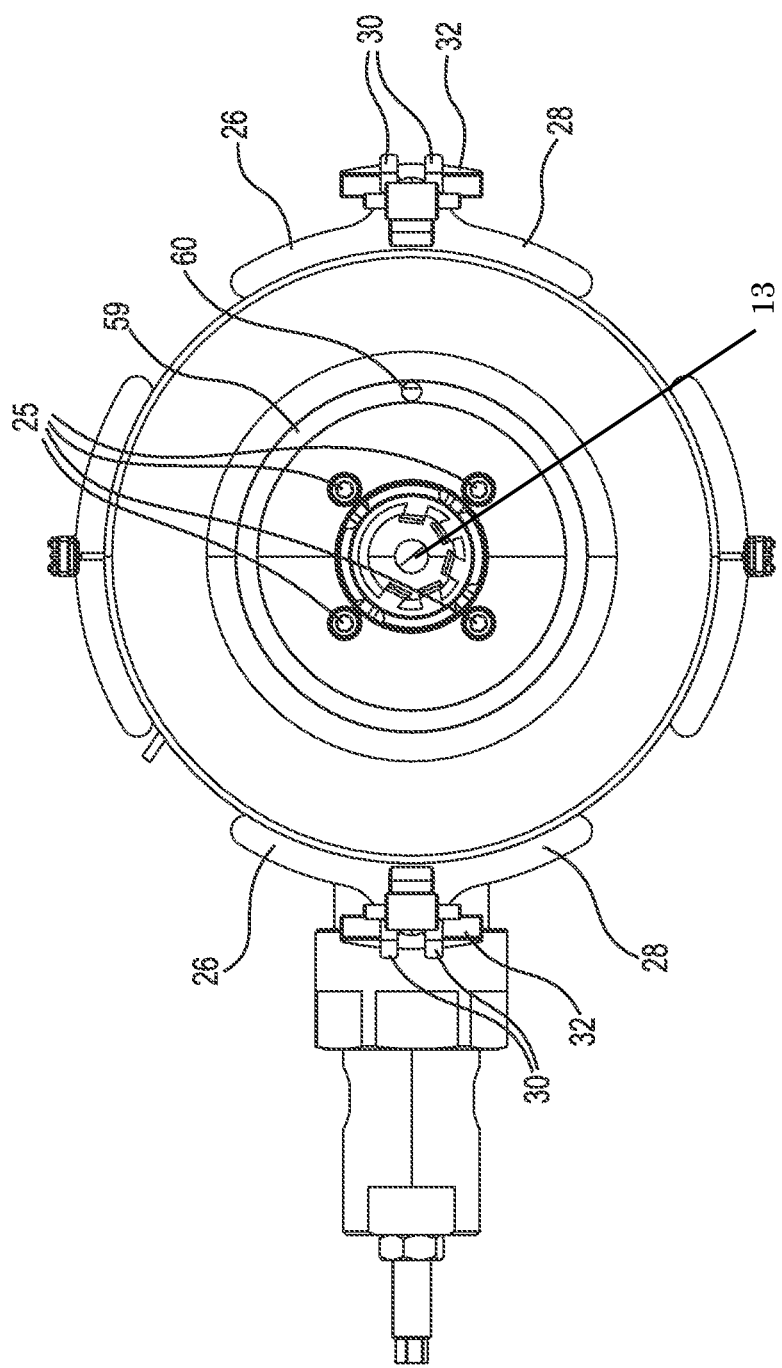
FIG. 3 is a top view of a support base of the machine lubrication system.

FIG. 2 is an exploded view of the machine lubrication system 10 of FIG. 1. As shown in FIG. 2, the support base 16 includes a first end surface 21 in contact with a top surface of the body 14, a second end surface 22 that is spaced from the first end surface 21, and a side surface 23 that extends between first end surface 21 and second end surface 22. The second end surface 22 has a larger diameter and surface area than that of the first end surface 21 for providing a support surface for the container 18. A passageway 24 extends between the first end surface 21 and the second end surface 22 and provides a pathway for lubricant to enter the inlet 13 of the pump body 14 (Shown in FIG. 3). In one embodiment, support base 16 is formed from machined aluminum. Passageway 24 includes a connection sleeve 27 for connecting the container 18 to the support base, as will be described further herein. As shown in FIGS. 2 and 3, support base 16 is provided with a plurality of bores 25 that extend from first end surface 21 to second end surface 22 and align with internally threaded bores in the top surface of the pump body 14 (not shown) to allow support base 16 to be connected to body 14 with a plurality of bolts. In one embodiment, body 14 is formed from machined steel. In one embodiment, a heater band 15 mounts to a portion of side surface 23 to heat the support base 16 to keep lubricant from becoming too viscous during extreme cold ambient temperatures.

Further referring to FIGS. 2-3, support base 16 includes first and second cover retainer mounts 26 on opposite sides of the support base 16. Each cover retainer mount 26 is comprised of a flange 28 and pair of spaced fingers 30 that extend generally transversely relative to the flange 28. Flanges 28 are connected to support base 16 by bolts. The spaced fingers 30 of each mount 26 function to retain a rubber T-handle latch 32 (FIG. 1) mounted on opposite sides of cover 20. A first end of latch 32 reversibly connects to cover 20, which enables replacement of the latch as needed. The second end of the T-handle latch 32, which includes a bulbous portion, stretches to fit between and fingers 30 and thereafter is biased against the fingers 30 to retain cover 20 in place over the container 18.

Referring to FIG. 2, container 18 is collapsible container comprised of an accordion-folded or bellows-type side wall 34, and a top wall 36 and a bottom wall 38 that are connected to the side wall 34 to define an interior for lubricant. Connected to and extending from the bottom wall 38 is a neck 40. In one embodiment, the neck 40 includes one or more protrusions 42 on an outer circumferential surface of the neck 40. The neck 40 has an open end that communicates with the interior of the container 18. When the container is filled with lubricant, the open end of neck 40 is hermitically sealed with a metal foil to prevent air from entering the container 18. The neck 40 can include threads at the end of the neck for threading a cap over the end to protect the metal foil seal until the container is to be connected to the support base 16. The neck 40 fits within the sleeve 27 in the passageway 24 of the support base 16 with the one or more protrusions 42 serving to connect the container 18 to the support base 16 as will be described further herein, and to allow grease to be pumped into the lubrication system. As the pump draws grease into the lubrication system, the side wall 34 of the container 18 collapses toward bottom wall 38 of the container. The container 18 is made of a polymer, such as polyethylene, in a blow molding process. In one embodiment, side wall 34 has a side wall thickness of between about 0.005 inches to about 0.030 inches.

Figure 4:
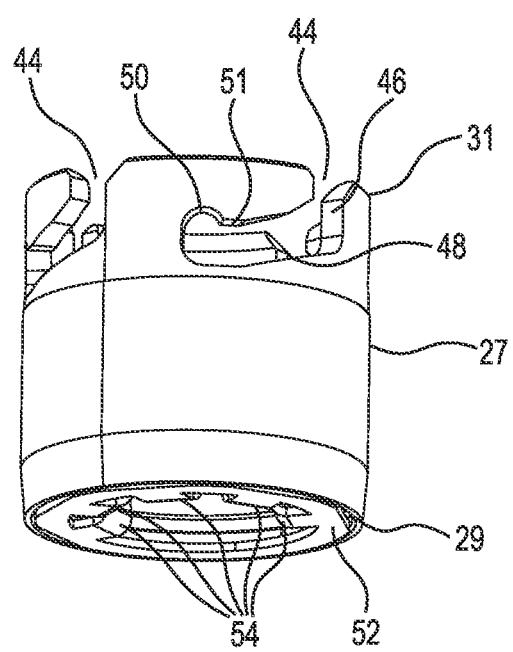
FIG. 4 is a side perspective view of a connection sleeve of the support base.
Figure 4A:
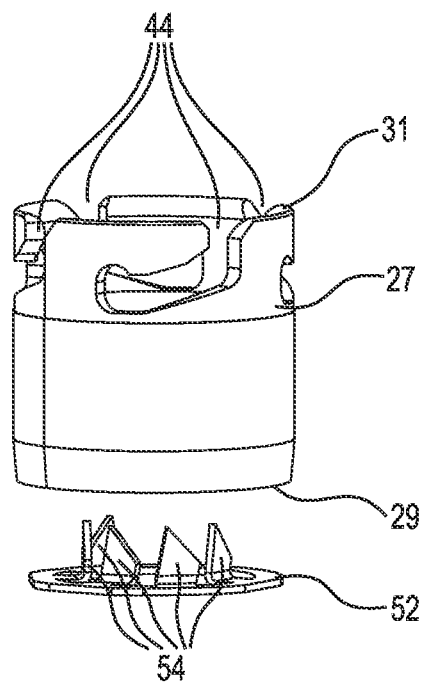
FIG. 4A is an exploded view of the connection sleeve of FIG. 4.
Figure 4B:
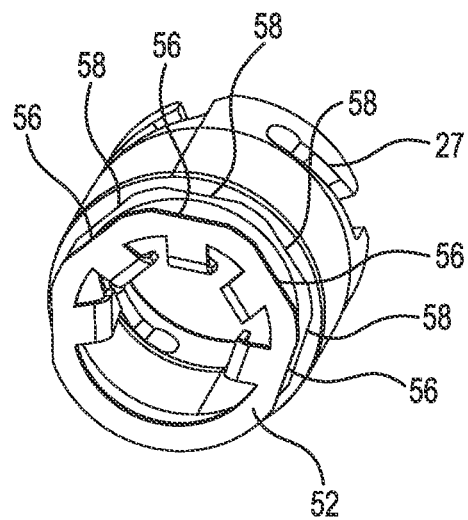
FIG. 4B is an end perspective view of the connection sleeve of FIG. 4A.

Referring to FIGS. 4 and 4A, in one embodiment sleeve 27 is a cylindrical aluminum sleeve having an outer diameter sized to allow sleeve 27 to be press fit into passageway 24 of support base 16. Sleeve 27 includes a first end 29, a second end 31, and one or more slots or channels 44 in the side wall of sleeve 27, the slots 44 being spaced about the circumference of sleeve to correspond to the spacing of protrusions 42 in the neck 40 of container 18. In the embodiment shown in FIG. 4, sleeve 27 includes four slots 44, although in other embodiments, fewer than four slots may be employed. Each slot 44 includes a first portion 46 that generally is parallel to central axis of sleeve 27 and extends from second end 31 partway toward the first end 29, a second portion 48 that extends from the first portion 46 at an angle toward the first end 29, and a third portion 50 that extends at an angle toward the second end 31 of sleeve 27. Slots 44 define a keyed pathway for protrusions 42 of neck 40 for securing container 18 to the support base 16. To secure container 18 to support base 16, protrusions 42 of neck 40 are inserted the first portion 46 of slots 44 until the protrusions align with the second portion 46. Container 18 is then rotated causing the protrusions 42 to be guided along second portion 46 and thus lowering the end of neck 32 toward the first end 29 of sleeve 27. A cutting ring 52 is connected to first end 29 of sleeve 27. In one embedment, Cutting ring 52 is formed from steel and includes one or more cutting blades 54 that extend within sleeve 27 axially toward second end 31. Cutting blades 54 are spaced about an arc of less than 360 degrees. As container 18 is rotated and the end of neck 32 moves toward first end 29 of sleeve 27, cutting blades 54 rupture the metal foil seal and partially cut it leaving the cut portion of the seal attached to an uncut portion of the seal so as to prevent the meal foil from being ingested into the lubricant stream when the pump is operating. As container 18 is further rotated, protrusions 42 of neck 40 move over a cam surface 51 of slots 44 and into the third portion 50 of slots 44, which secures neck fully into sleeve 27. As shown in FIG. 4B, the perimeter edge of cutting ring 52 includes one or more straight edge portions 56 that correspond to the perimeter shape of a complimentary recessed cavity 58 in first end 29 of sleeve 27 to register cutting ring 52 in a desired fixed position. Cutting ring 52 is secured within cavity 54, such as with adhesive, a c-clip retaining ring, or by welding.

Figure 5:
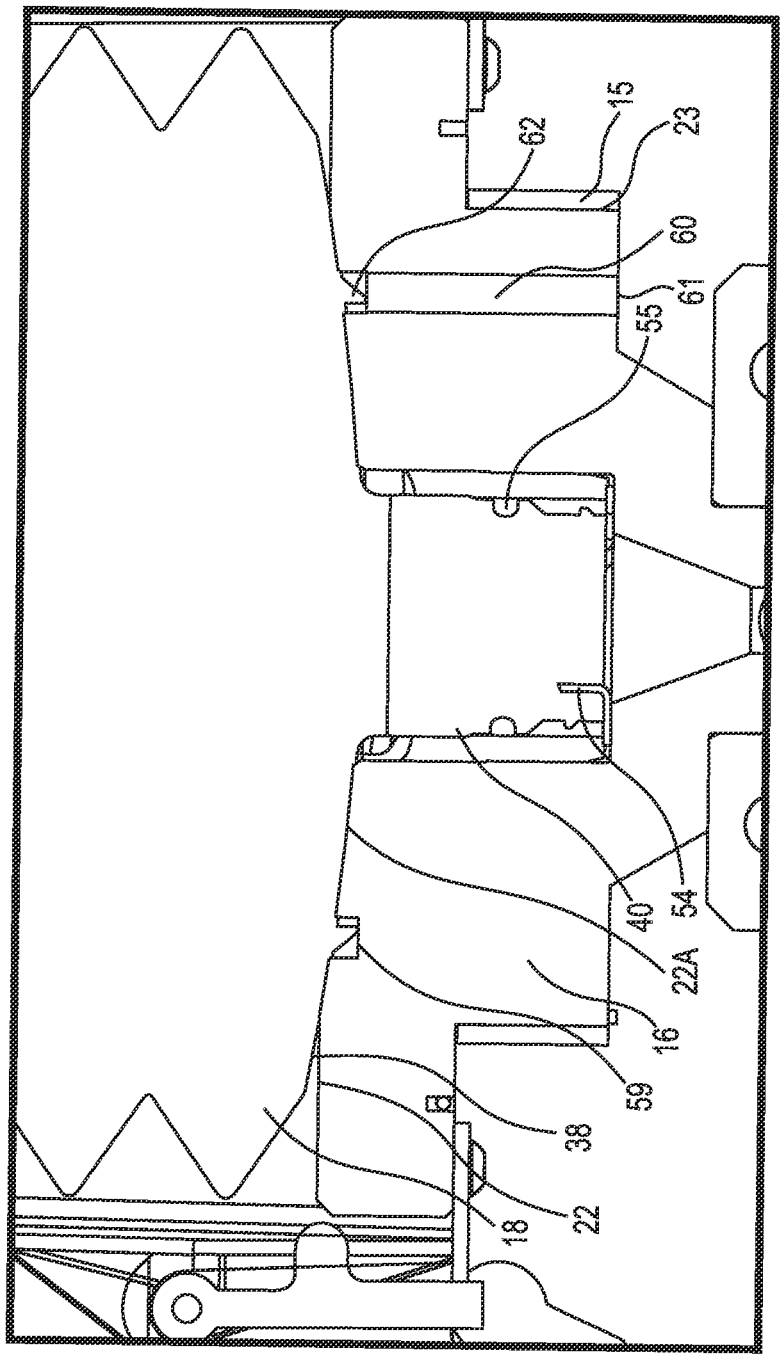
FIG. 5 is an enlarged cross sectional view of the connection of a container to a support base of the machine lubrication system of FIG. 1.

FIG. 5 shows an enlarged cross sectional view of the connection of container 18 to the support base 16. As shown in FIG. 5, the second end surface 22 of support base 16 includes a concave surface portion 22A and the bottom wall 38 of container 18 is formed to have a complimentary convex shape to mate with the concave surface portion 22A when the neck 40 of container 18 is secured within sleeve 27. This nesting contact between the support base 16 and the container 18 provides an enhanced support of container 18 to withstand shear forces on the container/support base connection due to vibration of the machine carrying the lubrication system. In one embodiment, the radius of curvature of surface portion 22A and bottom wall 38 is 18 inches. Bottom wall 38 further has a wall thickness that is greater than that of side wall 34 of container 18, which enhances the structural integrity of the connection of container 18 to support base 16. In one embodiment, a portion of bottom wall 38 surrounding neck 40 has a wall thickness of about 0.01 inches, and neck 40 has a wall thickness of between about 0.065 inches to about 0.185 inches. As further shown in FIG. 5, neck 40 includes a circumferential groove 55 located to be spaced from but near cutting ring 54 when the neck 40 is fully secured within sleeve 27. Circumferential groove 55 is located to mount an O-ring on neck 40 to create a seal of neck 40 within sleeve 27 before the cutting blades 54 rupture the metal foil seal over the end of neck 40, thereby preventing air from being introduced into the lubrication system.

As shown in FIGS. 3 and 5, in one embodiment, the second end surface portion 22A of support base 16 is provided with a circular groove 59 spaced in a radial direction from passageway 24. The groove 59 functions to prevent liquid contaminants (i.e., condensation, dust etc.) from flowing into the passageway 24 of the support base 16 when the container 18 is connected to support base 16. Groove 59 communicates with a drain bore 60 that extends from second end surface portion 22A through the support base to an opening 61 in side wall 23 below the second end surface 22 to direct contaminants out of groove 59. In one embodiment, an annular lip 62 protrudes from the outer surface of the bottom wall 38 of container 18. Lip 62 has a width less than that of groove 59 and is located to fit in the groove 59 to direct moisture/condensation that may form on the container 18 or within the cover 20 into the groove 59.

Referencing FIGS. 1 and 2, in one embodiment one or more proximity sensors 64 are mounted to the support base 16 to monitor the position of the container side wall 34 and detect when the container is getting low on lubricant. In the embodiment shown, two proximity sensors 64 are located on opposite sides of support base 16. In one embodiment, proximity sensors 64 are carried on a support bracket 66 that is comprised of a mounting flange 68 and an arm 70 extending generally normal to the flange 68. The arm 70 locates proximity sensor 64 adjacent to the container side wall spaced from the second support surface 22 of support base 16. As the container 18 collapses to a level below the proximity sensors 64, a signal is generated to indicate a low lubricant level in the container so a full lubricant container can be installed before the lubrication system runs out of lubricant. To accommodate the proximity sensors 64, cover 20 includes one or more cover wall extensions 72, which allow cover 20 to enclose and protect the container 18 and the one or more proximity sensors 64. Cover 20 has a side wall that is in close proximity to side wall 34 of container 18 which aids in maintaining a uniform collapse of side wall 34 of container 18 as lubricant is removed from the container.

The invention claimed is:

1. A lubricant delivery system for lubricating a machine, the lubricant delivery system comprising:
   a body with an inlet, the inlet communicating with a pump for pumping lubricant to components of the machine requiring lubrication;
   a support base connected to the body, the support base having a first end surface, a second end surface and a side wall extending between the first end surface and the second end surface, the second end surface being spaced from the first end surface, a passageway extending between the first end surface and the second end surface, the first end surface being mounted to the body, the passageway being in communication with the inlet of the body, wherein the second end surface of the support base comprises an annular groove spaced radially from the passageway, and wherein the support base includes a bore communicating between the annular groove and the side wall of the support base;
   a container having an interior filled with a lubricant, the interior being defined by a pleated side wall, a top wall connected to a first end of the pleated side wall, a bottom wall connected to a second end of the pleated side wall and a tubular neck connected to the bottom wall, the tubular neck having an open end, the open end in communication with the interior of the container, the tubular neck being reversibly mountable within the passageway of the support base with the bottom wall in contact with the second end surface of the support base, wherein the bottom wall of the container comprises an annular lip configured to fit in the annular groove.

2. The lubricant delivery system of claim 1, wherein the second end surface of the support base is a concave surface, and wherein the bottom wall of the container is a convex surface.

3. The lubricant delivery system of claim 1, wherein the annular lip has a width less than that of the annular groove.

4. The lubricant delivery system of claim 3, wherein the annular protrusion has a width less than that of the annular groove.

* * * * *